350-6.7 $$$ SR
E197Y XR 4,067,021
XR 350/6.7

United States 1

Baylis et al.

4,067,021

Jan. 3, 1978

[54] OPTICAL SCANNING APPARATUS

[75] Inventors: Howard Raymond Baylis, East Grinstead; Roger Alan Edwards, Crawley Down; David Richard Sweatman Hedgeland, Redhill, all of England

[73] Assignee: The Monotype Corporation Limited, England

[21] Appl. No.: 688,317

[22] Filed: May 20, 1976

[30] Foreign Application Priority Data

May 27, 1975 United Kingdom ............... 23090/75

[51] Int. Cl.[2] ........................ G01D 15/10; G01D 9/42; G02B 27/17

[52] U.S. Cl. .................................. 346/76 L; 346/108; 350/7

[58] Field of Search .................. 346/76 L, 108; 350/7

[56] References Cited

U.S. PATENT DOCUMENTS

| | | | |
|---|---|---|---|
| 3,154,371 | 10/1964 | Johnson | 346/76 L X |
| 3,441,949 | 4/1969 | Rolon | 346/108 |
| 3,701,999 | 10/1972 | Congleton et al. | 346/108 X |
| 3,758,187 | 9/1973 | Thomas et al. | 346/108 X |
| 3,809,806 | 5/1974 | Walker et al. | 346/108 X |

*Primary Examiner*—George H. Miller, Jr.
*Attorney, Agent, or Firm*—Morgan, Finnegan, Pine, Foley & Lee

[57] ABSTRACT

Optical scanning apparatus comprising a source of light, a rotatable reflecting element having a plurality of reflective facets which are inclined to the axis of rotation, a beam expander for deriving a collimated beam of light from the source, this collimated beam being directed at the reflecting element in a direction parallel to its axis of rotation to impinge upon successive facets thereof as it is rotated. The apparatus also includes a support, which may be a system of rollers, for defining a position for a recording element having a surface that requires scanning, a projection lens for focussing the collimated beam as reflected by the reflecting element onto the surface of the recording element, a motor coupled to rotate the reflecting element, so that each facet in turn causes the focussed beam to scan across the surface in one direction, and a drive for moving the recording element substantially perpendicular to the direction of scanning, past said focussed beam.

16 Claims, 4 Drawing Figures

2
3
4
5
6
7
8
9
10
11
12
13
13a
14
15
16
16a
17
18
19
20
21
22
23
24
25
26
27
28
28a
29

OPTICAL SCANNING APPARATUS

This invention relates to optical scanning apparatus intended particularly, but not exclusively, for use in a film setter in which the surface of a recording member is scanned with light beam modulated so as to build up, by repetitive scanning an image to be recorded.

One purpose of the invention is the provision of a relatively simple optical scanning apparatus which will facilitate rapid and accurate scanning of a surface, and for this purpose the apparatus comprises a source of light, a rotatable reflecting element having a plurality of reflective facets which are inclined to the axis of rotation, means for directing a collimated beam of light from the source at said reflecting element in a direction parallel to its axis of rotation to impinge upon successive facets thereof as it is rotated, means for defining a position for a recording element having a surface that requires scanning, means for focussing the collimated beam as reflected by said reflecting element onto said surface, and a motor coupled to rotate the reflecting element, so that each facet in turn causes the focussed beam to scan across the said surface in one direction, and a drive for moving the recording element substantially perpendicular to said one direction, past said focussed beam.

A preferred feature of the invention is the use of a laser as the light source. When used as a film setter, the surface to be scanned is a surface of an image recording member and means are provided for modulating the intensity of the light in order to produce a pattern of lines or dots on the surface of the recording member, so as to build up in successive scans an image of a character or group characters in accordance with signals determined by a stored digital representation of the character or character group.

Preferably each of the reflective facets of the rotary reflecting element is planar, and disposed at 45° to the axis of rotation thereof, so that the scanning light beam reflected from the reflecting element scans in a plane perpendicular to the axis of rotation.

Preferably the focussing element comprises a lens disposed between the reflecting element and the position for the recording member, and specially designed to produce a focussed spot in the plane of the recording member's surface so that the spot moves along a straight line at a speed which is proportional to the angular speed of rotation of the reflecting element.

Preferably means are provided to ensure proper synchronisation of the laser modulation as derived from information storage means, and the instantaneous position of impingement of the focused laser beam on the surface of recording member, along each scan line. These means may include a generator for generating a signal in accordance with the rotational movement of the reflecting element, which may be used to determine the instantaneous angular position of that element, and consequently the linear position of the scanning spot.

An optically sensitive generating device may be provided to detect the start of each successive scan of the film, caused by the reflection of the collimated laser beam by successive reflective facets of the reflecting element, and to provide a signal for use in controlling the modulation of the laser intensity.

The recording member is preferably a photosensitive film which is wound by a system of rollers from a supply reel to a take-up and is so arranged that the film is scanned repetitively across its width as the reflecting element rotates, the advancing of the film causing this repetitive scanning to execute a raster-like coverage of the film surface.

When used as a film setter, the laser is modulated and scanned over the photosensitive film surface to build up lines of alphabetic and numeric characters, the modulation being further controlled to ensure justification of the individual lines of characters.

An embodiment of the invention will now be described by way of example, with reference to the accompanying drawing, in which.

Figures 1, 2:
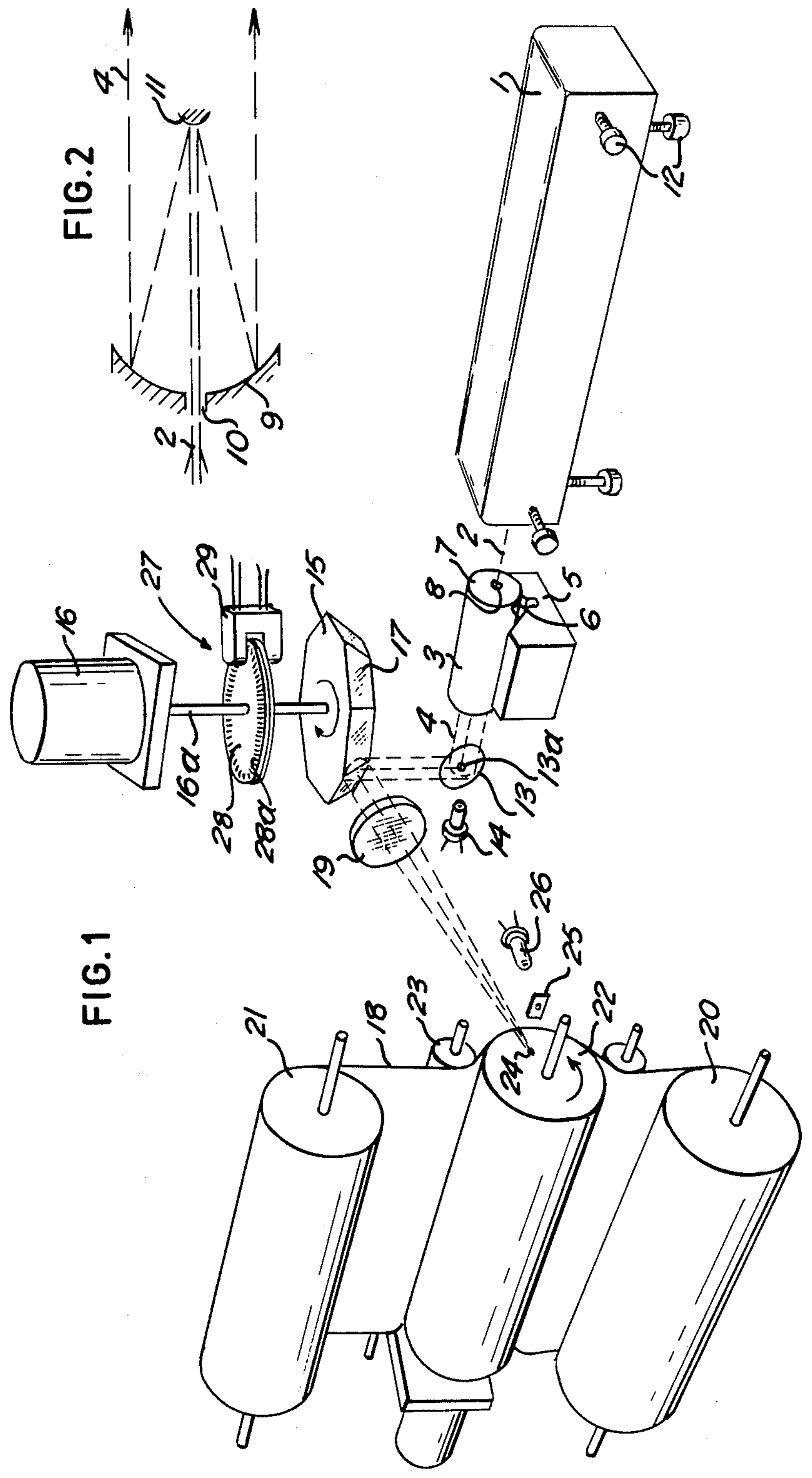
FIG. 1 illustrates schematically a scanning apparatus according to the invention, when used as a film setter.
FIG. 2 illustrates the optical constructional arrangement and operation of an optical device included in the scanning apparatus shown in FIG. 1.

In the apparatus shown in FIG. 1, a light source is constituted by a laser 1, for instance a helium-neon laser, having an output beam 2, which can be modulated in intensity in accordance with signals received from, for example, appropriate memory and logic circuits, either by means of an internal modulator incorporated in the laser, or by a separate electro-optic or a acousto-optic modulator (not shown) arranged in the path of the laser beam 2.

The laser beam 2 passes through a beam expander 3 which produces an enlarged diameter collimated laser beam 4. The beam expander comprises a cylindrical housing mounted on a block 5 which has a V-shaped groove 6 in which the housing rests, and a circular end wall 7 of the housing has a central aperture 8 through which the laser beam 2 passes. The optical construction of the beam expander is illustrated schematically in FIG. 2, and consists of a concave mirror 9 of relatively large focal length mounted coaxially within the cylindrical housing. The laser beam 2 passes through a small central hole 10 in the mirror 9 and impinges upon the surface of a small ball-shaped convex mirror 11 of relatively short focal length placed near to the focus of the concave mirror over a small solid angle of the mirror. The laser light is reflected and spreads out to fill the concave mirror where it is reflected again from the apparent focus of the concave mirror to produce the parallel collimated beam of light 4 of many times the original diameter of the beam 2. This beam 4, can eventually be readily focussed to produce a fine scanning spot, whereas without a beam expander it would be difficult or impossible to form such a spot from the original smaller diameter laser beam 2, as standard optical theory can show.

Accurate alignment of the beam expander and the laser can be achieved by substituting for the expander, a gauge comprising a hollow cylinder of the same diameter as the housing of the expander, and having at each end a circular end wall with a small central hole, through which the laser beam is aimed by adjusting the vertical and horizontal jacking screws 12 on the laser. When this cylinder gauge is subsequently exchanged for the beam expander, the latter will be in correct alignment with the laser beam 2.

A fixed mirror 13 is placed at 45° to the axis of the collimated beam 4 to fold the beam through 90° for compacting the whole system. This mirror 13 has a small central aperture 13a through which a small central portion of the collimated beam can pass toward a photocell 14 whose output is employed to compare the intensity of the laser beam when permanently on, with a required value, determined in accord with considerations to be explained later, to suit the film response characteristics.

The mirror 13 reflects the collimated beam onto a multi-faceted reflecting element 15 or polygon. The polygon is mounted for rotation by a high speed motor 16, and in the embodiment shown, has eight planar reflecting surfaces 16 around its periphery, each surface 16 being disposed at 45° to the polygon's rotational axis. The polygon is so mounted that the axis of rotation is parallel to the beam from the mirror 13 which strikes successive facets 17 in turn as the polygon rotates, to be reflected outwardly perpendicular to the polygon's axis of rotation.

The collimated beam as reflected from the polygon is focussed onto the surface of a photosensitive film 18 by a projection lens 19 which is specially designed as will be explained later. The film is advanced upwardly from a feed reel 20 to a take-up reel 21 by means of a drive roller 22 and idling rollers 23 which press the film onto the drive roller.

As the polygon rotates in a clockwise direction as shown, the film is repetitively scanned across its width by a focussed spot 24 which moves along a line parallel to the axis of rotation of the roller 22. One scan, from right to left in FIG. 1, is performed as the collimated light reflected from each successive facets 17 swings across the aperture of the lens 19 to be focussed onto the film.

For the purpose of clarity, the polygon 15 is shown in FIG. 1 on a larger scale than the other elements of the apparatus. Accordingly, the polygon is in fact smaller in relation to the collimated beam from mirror 13 than would appear from the drawing, this beam being sufficient in diameter to illuminate at least two adjacent facets 17, so that as a focussed spot from one facet clears the trailing edge of the film, i.e., the left hand edge as seen in FIG. 1, having just completed a transverse scan, a focussed spot from the following facet is in a position where it is about to commence the following transverse scan of the film.

The small size of the polygon permits a high speed of rotation by the motor 16, and consequently very rapid film scanning. Moreover the reflective area of the facets 17 controls the aperture of reflected beam to eliminate, or at least substantially reduce the variation in the intensity of the focussed spot between the centre and extreme ends of the scan line.

It should be noted that it is impossible, as geometrical optical theory can show, to produce a perfectly straight scan line on the film surface unless the light beam striking the polygon is brought to a focus coincident with the axis of rotation of the polygon. However, the arrangement herein disclosed places the focussing element, i.e., the lens 19, optically after the polygon whereby it is possible to use the collimated beam which is parallel to the axis of rotation of the polygon before reflection, and can therefore be said to produce a focus coincident with the axis at infinity.

A mirror chip 25 is positioned on the scan line of the spot 24 adjacent that end of the roller 22 where the spot begins each scan of the film, and reflects the beam onto a photocell 26 which produces a signal immediately before the start of each scan of the film surface. The output signals from the photocell 26 are fed to a computer which controls the laser modulation, to initiate a pattern cycle of laser beam modulation for producing the next line of modulated exposure on the film. In this way, successive scans of the intensity-modulated spot 24 across the film produce lines of exposure pattern which together form an image to be recorded.

The beam reflected from the polygon facets swings at the same angular speed as the polygon, and therefore the angular position of the polygon provides an indication of the angular position of the laser beam. Means 27, sectionally illustrated in FIG. 3, in the form of a signal generator, are provided for measuring the position of the polygon, these means comprising a pair of transparent discs 28, each having around its perimeter, a grating comprising a multiplicity of equally spaced opaque radial lines 28a, the width of the lines being approximately equal to the width of the transparent spaces therebetween. These discs are superposed coaxially one on top of the other, and one of them is coupled to the drive shaft 16a of the motor 16 to rotate therewith, while the other is fixed. A readout device 29 includes a light source 30 and a photocell 31 which views the light source through the superposed circumferential regions of the two discs. As the motor shaft and disc coupled thereto rotate, the photocell 31 produces a high frequency alternating signal in accordance with the periodic variation of the amount of light from the source 30 passing through the continually opening and closing shutter formed by the relatively moving gratings of the two discs. The photocell 31 of the readout device 29 views the light source through not one, but a number of adjacent radial spaces, and thus any minor positional error of any individual line or edge thereof tends to be absorbed by the response of the other lines viewed to give an average illumination value and an improved accuracy.

The output from the grating readout device 29 is fed to a phase locked loop circuit constructed in known manner, including a phase detector and voltage controlled oscillator to generate a signal of a frequency many times that of the grating readout signal.

This generated frequency fluctuates as the motor speed varies and fundamentally gives a signal which is geared to the polygon position. This signal therefore provides an indication of the instantaneous position of the laser spot along its scan line, and is used to synchronize the readout of digital information in the controlling computer's memory with this laser spot position, for the control of the modulation of the laser beam so that the various portions of characters along each scan are correctly positioned, even though the speed of the motor may have varied along the scan line. Without this form of control, a progressive deterioration of the placement of spot images along the scan lines can lead to unacceptable distortion of the character shapes and positions.

Figure 3:
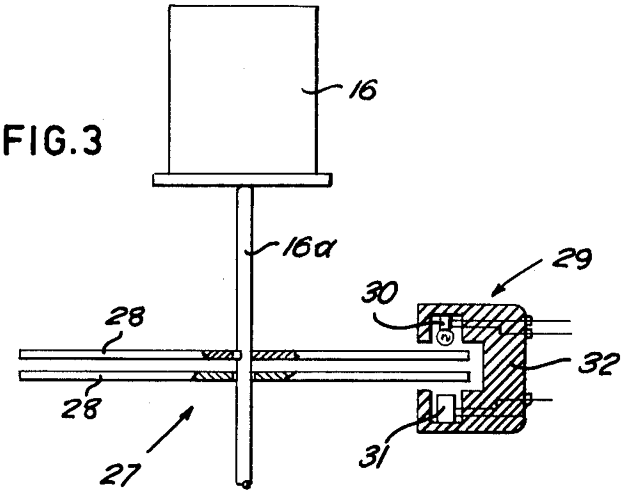
FIG. 3 is a schematic sectional view through a part of the apparatus of FIG. 1 employed to generate a signal in accordance with the rotation of the reflecting element.

As illustrated in FIG. 3, the light source 30 and photocell 31 are conveniently arranged in a U-shaped housing 32 mounted, with a limb on each side of the superposed discs 28, at a point on the circumference thereof.

Figure 4:
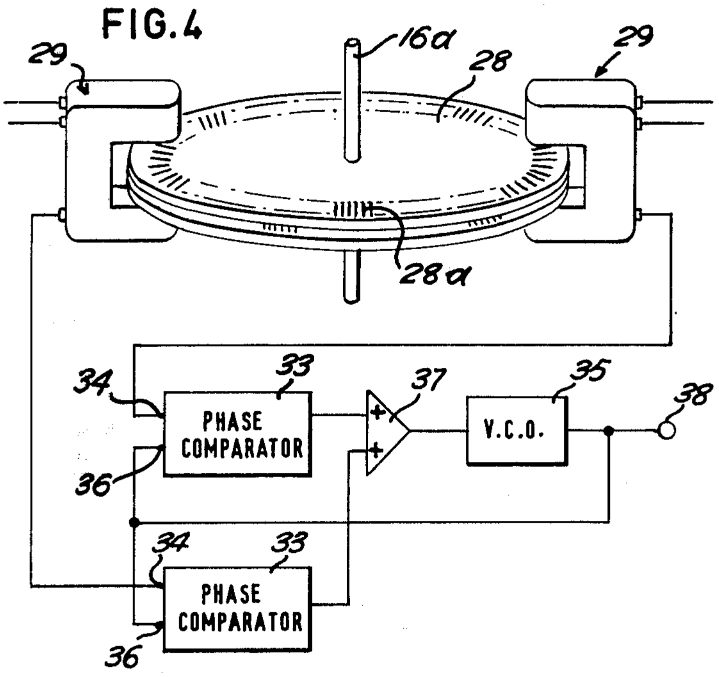
FIG. 4 illustrates a modification of the device shown in FIG. 3, together with a circuit, shown schematically in block diagram form, for use therewith.

FIG. 4 illustrates a modification of the above described signal generator, designed to correct for possible eccentricity in the mounting of the discs 28. It will be appreciated that if either or both of the discs is eccentrically mounted, the frequency of the signal generated by the single generator 27 of the arrangement of FIG. 3 will vary periodically with the rotation of the motor's output shaft, even if the speed of this rotation is absolutely constant. To compensate for this variation, the arrangement of FIG. 4 comprises two similar readout devices 29 placed at diametrically opposite points on the circumference of the discs 28. If the discs are eccentric, the frequencies of the signals from the two grating readout devices will fluctuate about a mean, and at any instant, if the frequency of one readout is higher than the mean the frequency of the other readout will be correspondingly lower than the mean. The desired signal is therefore at the mean of the two grating readout frequencies. Provided that the eccentricity is sufficiently small that the instantaneous phase difference between the two signals does not vary by more than plus or minus 90°, the phase locked loop circuit arrangement illustrated schematically in block diagram form in FIG. 4 can be used to derive a signal at this desired mean frequency. Two phase comparators 33 are supplied at their respective first inputs 34 with the signals from the two grating readout devices 29. These signals are compared in phase by the comparators with the output of a voltage controlled oscillator (VCO) 35 as supplied to the comparator's second inputs 36. The outputs of the two phase comparators are summed in a summing amplifier 37, whose output drives the VCO. The result is that the signal at the output 38 of the VCO lies midway in phase between the two signals at the first inputs 34, and is thus at the desired mean frequency. This VCO output signal can then be supplied to a frequency multiplying phase locked loop to generate a high frequency signal geared to polygon position, as before.

It will be appreciated that although it is necessary that the disc 28 coupled to the shaft **16*a* be provided with radial opaque lines around its entire periphery, the stationary disc need have only a small part or parts, in the region of the readout device or devices 29**, provided with radial opaque lines.

The projection lens 19 is of a special design from a computer program developed for the particular distortion required to ensure a linear relationship between the angular displacement of the collimated beam reflected by the polygon 15 and the resultant rectilinear displacement of the focussed spot in the flat image field.

A normal projection lens would produce a displacement from an oblique ray proportional to the tangent of the angle of obliquity (and therefore not in accord with a linear function) resulting in spatial distortion of character width shape and position, which would be most marked toward the lateral edges of the film. However with this special design of lens the image spot is displaced towards the centre by a prismatic effect built into the lens design to obtain the linearity to a high degree.

To overcome this spatial distortion, it is possible in place of the special projection lens 19, to employ a normal projection lens and an optical field flattening element as disclosed in our copending British patent application No. 45296/72, formed from a bunch of optic fibres and having a concave surface onto which the spot is projected and a substantially flat surface against which the film is pressed.

If a normal projection lens alone is used, the film must be bent into an arc to avoid spatial distortion, and while this is possible, it is clearly undesirable.

Knowing the Airy intensity distribution of illumination intensity plotted against displacemment from the centre of an ideal point light spot impinging on a flat surface, and also knowing the characteristics of film response of the film which it is proposed to use in the scanner, it is possible to determine and to plot a curve for the size of the exposed images produced by the spot on that particular film type for different intensities of laser beam used. It can be shown that, using this curve to select a suitable beam intensity level in relation to the film response characteristics, the size of the exposed area on the film due to the focussed spot may be made to be appreciably less then the Airy diffraction disc size. Thus the increase in spot size associated with diffraction effects when the diameter of the collimated beam to be focussed by the lens 19 is reduced may be compensated by suitable adjustment of beam intensity. In this way a smaller and consequently cheaper projection lens and polygon may be used.

With eight facets on the polygon, it can be shown that the angular sweep of each scan as the polygon rotates is approximately 45°. However, to avoid distortion, the field angle of the lens is limited to about 36°. The idle time during which the beam swings through the remaining angle at the beginning and end of the scan is used to clear the signal from one line scan before starting another scan. About 82% of the output from the polygon is used; with only four facets this figure drops to 41%. Also, during this idle time, the laser output is monitored by means of the photocell 14, and is compared as mentioned earlier with a manual setting adjusted to suit the particular film emulsion used, and the laser is switched on, so that before the focussed beam strikes the film it is reflected by the mirror chip 25 onto the photocell 26 to produce a signal which initiates the count of bits of information stored on the computer for modulating the laser in the next scan.

The film is traversed at 90° to the line of scan past an elongate aperture, and runs at a speed geared to the polygon speed to maintain the correct aspect ratio of the characters being generated.

We claim:

1. In optical scanning apparatus comprising a source of light, a rotatable reflecting element having a plurality of reflective facets which are inclined to the axis of rotation, means for directing a beam of light derived from the source at said reflecting element in a direction parallel to its axis of rotation to impinge upon successive facets thereof as it is rotated, means for defining a position for a recording element having a surface that requires scanning, means for focussing the beam as reflected by said reflecting element onto said surface, a motor coupled to rotate the reflecting element, so that each facet in turn causes the focussed beam to scan across said surface in one direction, and a drive for moving the recording element substantially perpendicular to said on direction, past said focussed beam, the improvement comprising a generator responsive to the rotational movement of the reflecting element to generate a signal indicative of the angular position of said reflecting element, said generator including a readout device comprising a further light source and a photocell and a shutter comprising a pair of elements each provided with a grating formed by an array of alternate opaque and transparent portions, said photocell being arranged to view the light source through the gratings, said elements being mounted for relative movement in accord with the rotation of the reflecting element, whereby illumination of the photocell is modulated cyclically at a frequency which varies in accord with the speed of rotation of the reflecting element.

2. Optical scanning apparatus according to claim 1, wherein the beam of light directed at the reflecting element is collimated.

3. Optical scanning apparatus according to claim 1 in which each of the reflective facets of the rotary reflecting element is planar and disposed at 45° to the axis of rotation thereof, so that the scanning light beam reflected from the reflecting element scans in a plane perpendicular to the axis of rotation.

4. Optical scanning apparatus according to claim 1 in which the focussing element comprises a lens disposed between the reflecting element and the position for the recording member, and specially designed to produce a focussed spot in the plane of the recording member's surface so that the spot moves along a straight line at a speed which is proportional to the angular speed of rotation of the reflecting element.

5. Optical scanning apparatus according to claim 1 in which modulation means are provided for modulating the intensity of the light from the light source.

6. Optical scanning apparatus according to claim 1, including an optically sensitive generating device arranged adjacent the position for the recording member, for detecting the start of each successive scan of the film, caused by the reflection of the collimated laser beam by successive reflective facets of the reflecting element.

7. Optical scanning apparatus according to claim 1, including a system of rollers for winding a photosensitive film from a supply reel to a take-up reel so that the film is scanned repetitively across its width by the focussed beam as the reflecting element rotates, the advancing of the film causing this repetitive scanning to execute a raster-like coverage of the film surface.

8. Optical scanning apparatus according to claim 1, including an optically sensitive generating device arranged to sample the collimated beam of light derived from said source and to produce a signal in accord with the intensity thereof.

9. Optical scanning apparatus according to claim 1 wherein the source of light is a laser.

10. Optical scanning apparatus according to claim 9 including a beam expander disposed between the laser and the reflecting element, for producing a collimated beam substantially larger in cross section then the beam from the laser.

11. Optical scanning apparatus according to claim 1, in which the elements are mounted with their gratings superposed one upon the other, the grating of the first element being circular, with the opaque and transparent portions arranged in a circumferentially alternate manner, in which the first element is mounted for rotation with the reflecting element about the centre of said circular grating, and in which the other of said elements is fixed relative to the readout device the spacing of the opaque and transparent portions of its grating corresponding to that of the grating on the first element.

12. Optical scanning apparatus according to claim 11 said first and second elements comprising respective first and second coaxially mounted superposed discs, the circular grating on the first disc extending around its periphery and the grating on the second disc extending peripherally thereof at least in the region of the readout device.

13. Optical scanning apparatus according to claim 12 wherein the diameter of, and the gratings on said first and second discs are identical.

14. Optical scanning apparatus according to claim 12, including a pair of said readout devices disposed at diametrically opposite points on said discs.

15. Optical scanning apparatus according to claim 14 including generating means for deriving a signal at a frequency midway between the instantaneous frequencies of the signals from the two readout devices.

16. Optical scanning apparatus according to claim 15 wherein said generating means comprises a phase-lock loop including a voltage controlled oscillator having an output and a control input, two phase comparators each having a first input coupled to receive the signal from a respective one of the readout devices, a second input coupled to the output of the voltage controlled oscillator, and an output, means for summing the signals at the outputs of the phase comparators to produce a resultant signal and for supplying the resultant signal to the control input of the voltage controlled oscillator.

* * * * *

UNITED STATES PATENT AND TRADEMARK OFFICE

CERTIFICATE OF CORRECTION

PATENT NO. : 4,067,021

DATED : January 3, 1978

INVENTOR(S) : Howard Raymond Baylis et al.

It is certified that error appears in the above-identified patent and that said Letters Patent are hereby corrected as shown below:

Claim 1, Col. 6, line 57, "on" should be --one--;

Claim 10, Col. 8, line 4, "then" should be --than--.

Signed and Sealed this

***Thirteenth* Day of *June 1978***

[SEAL]

*Attest:*

RUTH C. MASON
*Attesting Officer*

DONALD W. BANNER
*Commissioner of Patents and Trademarks*